United States Patent
Le et al.

(10) Patent No.: US 7,460,472 B2
(45) Date of Patent: Dec. 2, 2008

(54) SYSTEM AND METHOD FOR TRANSMITTING INFORMATION IN A COMMUNICATION NETWORK

(75) Inventors: Huihua Le, Beijing (CN); Haitao Wu, Beijing (CN); Yuehui Jin, Beijing (CN); Dongmei Zhang, Beijing (CN); Jian Ma, Beijing (CN)

(73) Assignee: Nokia Corporation, Espoo (FI)

( * ) Notice: Subject to any disclaimer, the term of this patent is extended or adjusted under 35 U.S.C. 154(b) by 1133 days.

(21) Appl. No.: 10/683,352

(22) Filed: Oct. 14, 2003

(65) Prior Publication Data

US 2005/0022089 A1 Jan. 27, 2005

(30) Foreign Application Priority Data

Jul. 25, 2003 (EP) .................................. 03017068

(51) Int. Cl.
H04J 1/16 (2006.01)
(52) U.S. Cl. ..................... 370/229; 370/252; 714/748
(58) Field of Classification Search ................ 370/235, 370/236, 466, 467, 252, 278, 282, 229, 230, 370/395.4; 455/450; 709/224; 714/748, 714/749
See application file for complete search history.

(56) References Cited

U.S. PATENT DOCUMENTS

| 6,757,248 B1* | 6/2004 | Li et al. ...................... 370/235 |
| 2003/0123481 A1* | 7/2003 | Neale et al. .................. 370/466 |
| 2004/0042460 A1* | 3/2004 | Gruhl et al. .............. 370/395.4 |

* cited by examiner

*Primary Examiner*—John Pezzlo
(74) *Attorney, Agent, or Firm*—Squire, Sanders & Dempsey, L.L.P.

(57) ABSTRACT

A method and system for transmitting information between a sending means and a receiving means using packets for information transmission. The receipt of transmitted packets is acknowledged and unacknowledged packets are retransmitted from the sending means. The amount of transmitted unacknowledged information or the number of consecutive unacknowledged packets is detected, and the reason for information or packet loss is determined based on the amount of transmitted unacknowledged information or the number of consecutive unacknowledged packets. This amount is compared with a path maximum transmission unit (PMTU) to determine the reason for loss. A single or small number of unacknowledged packets is determined to be a result of Bit Error Rate (BER), whereas a larger number of consecutive unacknowledged packets may be determined to be congestion. Congestion control parameters are kept unchanged when the reason for loss is caused by Bit Error Rate (BER), whereas control parameters are changed when the reason for loss is congestion.

26 Claims, 5 Drawing Sheets

| TRIGGER PACKET CHUNKS TSN | SACK CUMULATIVE-TSN | LEFT EDGE | RIGHT EDGE |
|---|---|---|---|
| 13 14(LOST) | | | |
| 15 16(LOST) | | | |
| 17 18 | 12 | 5 | 6 |
| 19 20 | 12 | 5 | 8 |
| 21 22 | 12 | 5 | 10 |
| 23 24(TRIGGER WFRS) | 12 | 5 | 12 |

FIG. 3

SENDER ENABLES BUNDLING AND THE 1ST AND
2ND PACKETS ARE LOST DUE TO CONGESTION

| TRIGGER PACKET CHUNKS TSN | SACK CUMULATIVE-TSN | LEFT EDGE | RIGHT EDGE |
|---|---|---|---|
| 13 14(LOST) | | | |
| 15 16 | 12 | 3 | 4 |
| 17 18 | 12 | 3 | 6 |
| 19 20 | 12 | 3 | 8 |
| 21 22(TRIGGER WFRS) | 12 | 3 | 10 |

FIG. 4

SENDER ENABLES BUNDLING AND
1ST PACKET IS LOST DUE TO BER

| TRIGGER PACKET CHUNKS TSN | SACK CUMULATIVE-TSN | LEFT EDGE | RIGHT EDGE |
|---|---|---|---|
| 13 (LOST) | | | |
| 14 (LOST) | | | |
| 15 | 12 | 3 | 3 |
| 16 | 12 | 3 | 4 |
| 17 | 12 | 3 | 5 |
| 18(TRIGGER WFRS) | 12 | 3 | 6 |

FIG. 5

SENDER DISABLES BUNDLING AND 1ST AND 2ND PACKETS ARE LOST DUE TO CONGESTION

| TRIGGER PACKET CHUNKS TSN | SACK CUMULATIVE-TSN | LEFT EDGE | RIGHT EDGE |
|---|---|---|---|
| 13 (LOST) | | | |
| 14 | 12 | 2 | 2 |
| 15 | 12 | 2 | 3 |
| 16 | 12 | 2 | 4 |
| 17(TRIGGER WFRS) | 12 | 2 | 5 |

FIG. 6

SENDER DISABLES BUNDLING AND 1ST PACKET IS LOST DUE TO BER

SYSTEM AND METHOD FOR TRANSMITTING INFORMATION IN A COMMUNICATION NETWORK

BACKGROUND OF THE INVENTION

1. Field of the Invention

The present invention relates to a method, system and network element implementing a transmission using a transport protocol. In particular but not restricted thereto, the invention relates to a Fast Recover algorithm to improve performance of a reliable transport protocol, for instance SCTP (Stream Control Transmission Protocol) or TCP (Transmission Control Protocol), over a wireless link.

2. Description of the Related Art

SCTP (Stream Control Transmission Protocol) is a reliable transport protocol, which has been approved by the IETF (Internet Engineering Task Force) as a Proposed Standard [RFC2960]. Congestion control algorithms used by SCTP are based on [RFC2581].

A current problem is that standard transport protocols, e.g. SCTP, are designed for wired links. They interpret all packet losses as the result of network congestion and the corresponding congestion control process (algorithm), e.g. Fast Retransmission, will be triggered accordingly. However, in wireless links, there are quite many individual packet losses caused by link error or bit error. In this case, SCTP would be trapped into frequent Fast Retransmission processes caused by such individual packet losses and the congestion window would be restrained to a low level.

A lot of approaches have been proposed to enhance the performance of transport protocols in wireless network, such as:

I-TCP described in: A. Bakre and B. Badrinath: "I-TCP: Indirect TCP for Mobile Hosts. *In Proceedings of the IEEE ICDCS'95*, pages 136-143, 1995";

M-TCP described in: Kevin Brown and Suresh Singh, "M-TCP: TCP for Mobile Cellular Networks", in *Proceedings of the ACM SIGCOMM Computer Communication Review*, pages 19-43, 1997;

EBSN described in: Bikram S. Bakshi, P. Krishna, N. H. Vaidya, and D. K. Pradhan, "Improving Performance of TCP over Wireless Networks", in *Technical Report* 96-014, Texas A & M University, 1996;

WTCP described in: Karu Ratnam and Ibrahim Matta, "Effect of Local Retransmission at Wireless Access Points on the Round Trip Time Estimation of TCP", in *Proceedings of IEEE 31st Annual Simulation Symposium '98*, April 1998, or in: Karu Ratnam and Ibrahim Matta, "WTCP: An Efficient Mechanism for Improving TCP Performance over Wireless Links", in Proceedings of the *Third IEEE Symposium on Computer and Communications* (ISCC '98), June 1998; or SNOOP described in: H. Balakrishnan, S. Seshan, E. Amir, and R. Katz, "Improving TCP/IP Performance over Wireless Networks", in *Proceedings of the 1st ACM Int'l Conf. On Mobile Computing and Networking* (Mobicom), November 1995.

Most of these proposals need a Wired-Wireless Gateway to hide the wireless link feature. The Wired-Wireless Gateways (generally a base station) detect the loss, buffer some amount of data (e.g., to perform local retransmission, etc), and do some extra processing for each connection going through them.

SUMMARY OF THE INVENTION

The invention provides an improvement of performance of the transport protocol used for transmission, e.g. SCTP and/or TCP. In a preferred embodiment, reports generated by a network element, e.g. SACK (Selective Acknowledgement) reports, are used for determining the cause of segment loss.

One aspect of the invention proposes a Fast Recover algorithm to improve protocol performance, e.g. SCTP performance, over wireless link.

Under the assumption that congestion results in consecutive multiple packet losses, and link errors cause individual packet loss, a method to determine the packet loss reason (e.g., congestion or link error) is provided and an appropriate process is performed based on the determination result.

In one of the preferred embodiments, the sender, e.g. SCTP sender, determines the packet loss reason based on reports, e.g. gap report in SACK, sent by the receiver. If the reason is congestion, the sender will perform standard congestion control, e.g. SCTP congestion control, as usual. If the reason is link error, the sender will keep its congestion control parameters, e.g. slow-start threshold and congestion window size, to the value before packet loss. Therefore the sender can keep its original speed and avoid throughput reduction caused by wireless link error. This solution is also applicable to other protocols such as TCP with SACK.

Preferred embodiments of the invention relate to the optimization of SCTP protocol or TCP with SACK over wireless network. A gap report is preferably used to determine the packet loss reason, for example, link error or congestion.

The proposed algorithm, method and system can improve the data transfer over a wireless link that is generating bit errors.

Even in a case that bit errors should last for a longer time which happens rarely, the invention will not degrade performance. Such a case will be dealt with as if a congestion had happened.

The present invention provides some modifications to the end points, that is the receiving or transmitting terminals, for instance SCTP (or TCP) endpoints or terminals, which may be movable or stationary. The method may be used as a standard, or may be used only uplink in terminals, e.g. mobile terminals, without need of standardization.

BRIEF DESCRIPTION OF THE DRAWINGS:

FIGS. 3 to 6 illustrate examples of SACKs received by the sender when congestion or link errors occur during the transmission.

DETAILED DESCRIPTION OF THE PREFERRED EMBODIMENTS

Figure 1:
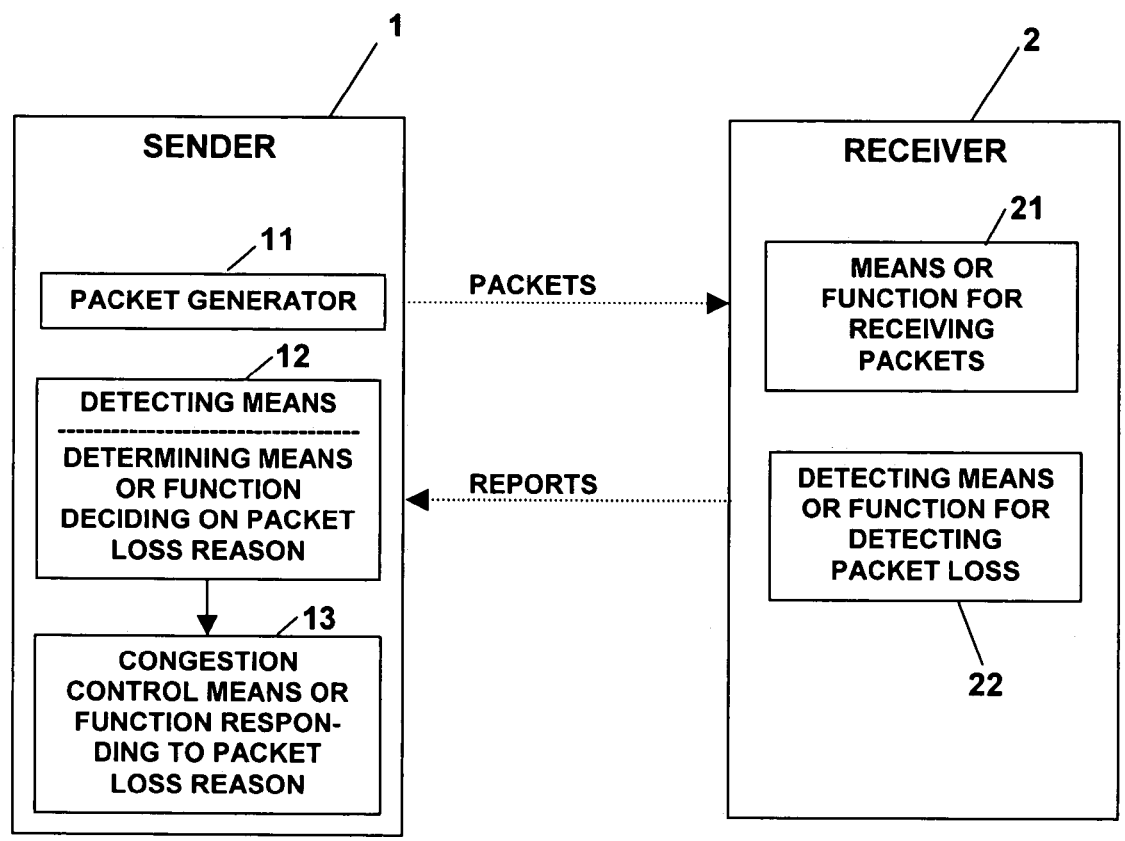
FIG. 1 shows a basic structure of an embodiment of the invention.

Basically, in the present embodiment illustrated in FIG. 1, a transmitter (sender) 1 and a receiver 2 are shown which transmit data preferably in the form of packets between the sender and receiver. The sender 1 includes a packet generator 11 which generates packets for information transmission to the receiver 2. The packets may include a header, one or more chunks and a checksum for detecting bit errors caused by the transmission. Further, the sender 1 includes a portion or function 12 deciding on the reason of packet or chunk loss based on reports received from the receiver 2. Said reports indicate received packets, or the gaps of packets or chunks not yet received, or acknowledged to be received, by the receiver 2. Function 12 includes a detecting portion for detecting the amount of unacknowledged information or the number of consecutive unacknowledged packets, and a determining portion or function for deciding on the reason of packet or chunk loss based on the reports received from the receiver 2. The sender 1 further includes a congestion control portion or function 13 for congestion control providing congestion control parameters. In response to the decision output from function 12, the congestion control function 13 of the sender 1 adjusts congestion control parameters and retransmits the lost chunks or packets (which are not acknowledged by the receiver 2 in the reports).

The receiver 2 includes a portion or function 21 for receiving and checking packets transmitted from the sender 1, and a detecting portion or function 22 for preparing reports to be sent to the sender 1. The detecting function 22 may detect packet loss by checking the consecutive packet or chunk numbers and, when missing numbers are detected, may prepare reports such as Gap Ack reports or blocks which will be described below.

The described embodiments use a transport protocol for data transmission, the transport protocol having a reliability control, e.g. congestion control, and is preferably operating on top of a connectionless packet network such as an IP network. Preferably SCTP (Stream Control Transmission Protocol) or TCP (Transmission Control Protocol) is used, although other protocols with similar functionality, could also be used SCTP and TCP are reliable transport protocols which offer reliable, non-duplicated transfer of user datagrams.

Before describing embodiments in accordance with the invention in more detail, the standard functionality of SCTP will be explained. Basically, the protocol data units (PDU) of SCTP are called SCTP packets. If SCTP runs over IP, an SCTP packet forms the payload of an IP packet. An SCTP packet is composed of a common header and one or more chunks. For the identification of an association, SCTP uses the same port concept as TCP and UDP.

Multiple chunks may be multiplexed into one packet up to the Path-MTU size. A chunk may contain either control information or user data. Each chunk begins with a chunk type field, which is used to distinguish data chunks and different types of control chunks, followed by chunk specific flags and a chunk length field needed because chunks have a variable length. The value field contains the actual payload of the chunk. Several chunk types are defined for standard use.

A SACK (Selective Acknowledgment) message is a chunk which is sent to the sending peer endpoint to acknowledge received data chunks and to inform the peer endpoint of gaps in the received subsequences of data chunks as represented by their TSNs (Transmission Sequence Numbers). The SACK contains a Cumulative TSN Ack parameter. By definition, the value of the Cumulative TSN Ack parameter is the last TSN received before a break in the sequence of received TSNs occurs; the next TSN value following this one has not yet been received at the endpoint sending the SACK. This parameter therefore acknowledges receipt of all TSNs less than or equal to its value.

The SACK also contains zero or more Gap Ack Blocks (Ack means Acknowledgment). Each Gap Ack Block acknowledges a subsequence of TSNs received following a break in the sequence of received TSNs. By definition, all TSNs acknowledged by Gap Ack Blocks are greater than the, value of the Cumulative TSN Ack. The Gap Ack Blocks in the SCTP SACK carry the same semantic meaning as the TCP SACK.

Generally, in SCTP, when a receiver detects one or more gaps in the sequence of data chunks, each received SCTP packet is acknowledged by sending a Selective Acknowledgement (SACK) which reports all gaps. The SACK is contained in a specific control chunk. Whenever the sender receives some, e.g. four consecutive SACKs reporting the same data chunk missing, this data chunk is retransmitted immediately (fast retransmit). Most up-to-date operating systems already support a similar optional extension to TCP.

SCTP uses an end-to-end window based flow and congestion control mechanism similar to the one that is well known from TCP (TCP Congestion Control). The sender keeps a variable known as Congestion Window (CWND) that controls the maximum number of outstanding bytes (i.e. bytes that may be sent before they are acknowledged). Each received data chunk must be acknowledged, and the receiver may wait a certain time (usually 200 ms) before that is done. Should there be a larger number of SCTP packets with data received within this period, every second SCTP packet containing data is to be acknowledged at once by sending a SACK chunk back to the sender.

The acknowledgements ACKs may carry all TSN (Transmission Sequence Number) numbers that have been received by one side with them. Further, the Gap Blocks (Gap Ack Blocks) indicate that segments of data chunks have arrived, with some data chunks missing in between. Should some data chunks have been lost in the course of transmission, they will either be retransmitted after the transmission timer has expired, or after four SACK chunks have reported gaps with the same data chunk missing. In the latter case, the missing data is retransmitted via the Fast Retransmit mechanism. In case a retransmission occurs which signals packet loss, the implementation must appropriately update congestion and flow control parameters.

SCTP thus employs a "Fast Retransmit on Gap Report" technique, that is a Fast Retransmit algorithm which relies on reports from the receiver, e.g. on counting "Gap report" in SACK (Selective Acknowledgment). Whenever an endpoint receives a SACK that indicates some TSN(s) missing, it waits for some, e.g. 3 further missing indications (via subsequent SACK's) on the same TSN(s) (TSN=Transport Sequence Number) before taking action with regard to Fast Retransmit.

As in TCP, SCTP has two modes, Slow Start and Congestion Avoidance. The mode is determined by a set of congestion control variables. For successfully delivered and acknowledged data the congestion window variable (CWND) is steadily increased, and once it exceeds a certain boundary (called Slow Start Threshold, SSTRESH), the mode changes from Slow Start to Congestion Avoidance. Generally, in Slow Start, the CWND is increased faster (roughly one MTU (Maximum Transmission Unit) per received SACK chunk), and in Congestion Avoidance mode, it is only increased by roughly one MTU per Round Trip Time (RTT). Events that trigger retransmission (timeouts or fast retransmission) cause the SSTHRESH to be cut down drastically, and reset the CWND (where a timeout causes a new Slow Start with CWND=MTU, and a Fast Retransmit sets CWND=SSTHRESH).

Since the Path MTU (PMTU) is an important variable influencing the congestion control, SCTP implementations usually keep a variable for the estimate of the current Maximum Transmission Unit (Path MTU) for each path.

Thus, in standard SCTP, when the TSN(s) is reported as missing in the fourth consecutive SACK, a procedure is performed wherein the data sender adjusts a threshold value Ssthresh (slow start threshold) and a current congestion control window size CWND (CWND means Congestion window) of the destination address(es) to which the missing DATA chunks were last sent, according to the formula:

Ssthresh=max(CWND/2, 2*MTU)

CWND=Ssthresh.

Then the sender determines how many of the earliest (i.e., lowest TSN) data chunks marked for retransmission will fit into a single packet, subject to constraint of the PMTU (Path MTU, MTU=Maximum Transmission Unit, or Maximum Transfer Unit) of the destination transport address. Because CWND in SCTP indirectly bounds the number of outstanding TSN's, the effect of TCP fast-recovery is achieved automatically with no adjustment to the congestion control window size. So when the endpoint decides losses through Gap report in SACK, it reduces CWND and comes into the state of congestion avoidance.

SCTP's congestion control and avoidance algorithms are based on the notion that the network is a black-box. Whether the network is congested or not is determined by the end-systems, which probe for the network state by gradually increasing the load on the network (by increasing the window of packets that are outstanding in the network) until the network becomes congested and a packet is lost. So SCTP always treats packet loss as indication of congestion.

When said congestion control is applied into the wireless network, link error causes individual packet losses frequently. Most of the losses will be detected by duplicated missing report in SACK. Subsequently, SCTP would be trapped into the frequent Fast Retransmission. As a result, the SCTP's CWND would be restrained to a low level, which reduces the utilization of bandwidth significantly. Thus, the performance of reliable transport protocols such as TCP and SCTP is degraded significantly due to the high BER (Bit Error Rate) introduced by wireless link. So it is an important benefit if the Fast Retransmit algorithm of SCTP is improved to alleviate the negative effect of link error.

Accordingly, embodiments of the invention apply a new algorithm referred to as WFRS (Wireless Fast Recover algorithm with SACK) to be applied in wireless networks.

One concept behind the approach of the invention is based on the assumption that congestion losses mean consecutive multiple losses while the link errors cause individual packet loss. Consequently, it is desirable that the number of consecutive lost packets be detected. Thus, a single lost packet or a small number of packet loss is determined to be a result of BER, introduced by the wireless link whereas, the loss of multiple consecutive packets is determined to be an indication of congestion.

The transport protocol is modified, e.g. by modifying the Fast Retransmit algorithm of SCTP, to be more efficient in wireless network.

The standard SCTP includes SACK function. Consequently, the sender can distinguish between multiple consecutive losses and individual losses using the gap report in SACK sent by the receiver. According to the difference between the number of packet loss due to BER (Bit Error Rate) and Congestion, generally an individual packet loss can be treated as the result of BER. Otherwise, a detected multiple packet loss is treated as an indication of congestion.

In one embodiment of the invention, when there is a single packet loss reported by the receiver, this fact is determined and treated as a result of BER. Otherwise, it is determined that two or more consecutive packet losses are due to congestion having occurred.

When packet loss occurs due to BER but not due to congestion, the SCTP sender does not need to reduce its CWND to slow the sending speed. So the process responding to this determined BER cause preferably maintains the Ssthresh and CWND at the value before packet loss. By doing this, the SCTP sender can keep its original speed. When the SCTP sender treats packet loss as the indication of congestion, it would act using normal SCTP.

Figure 7:
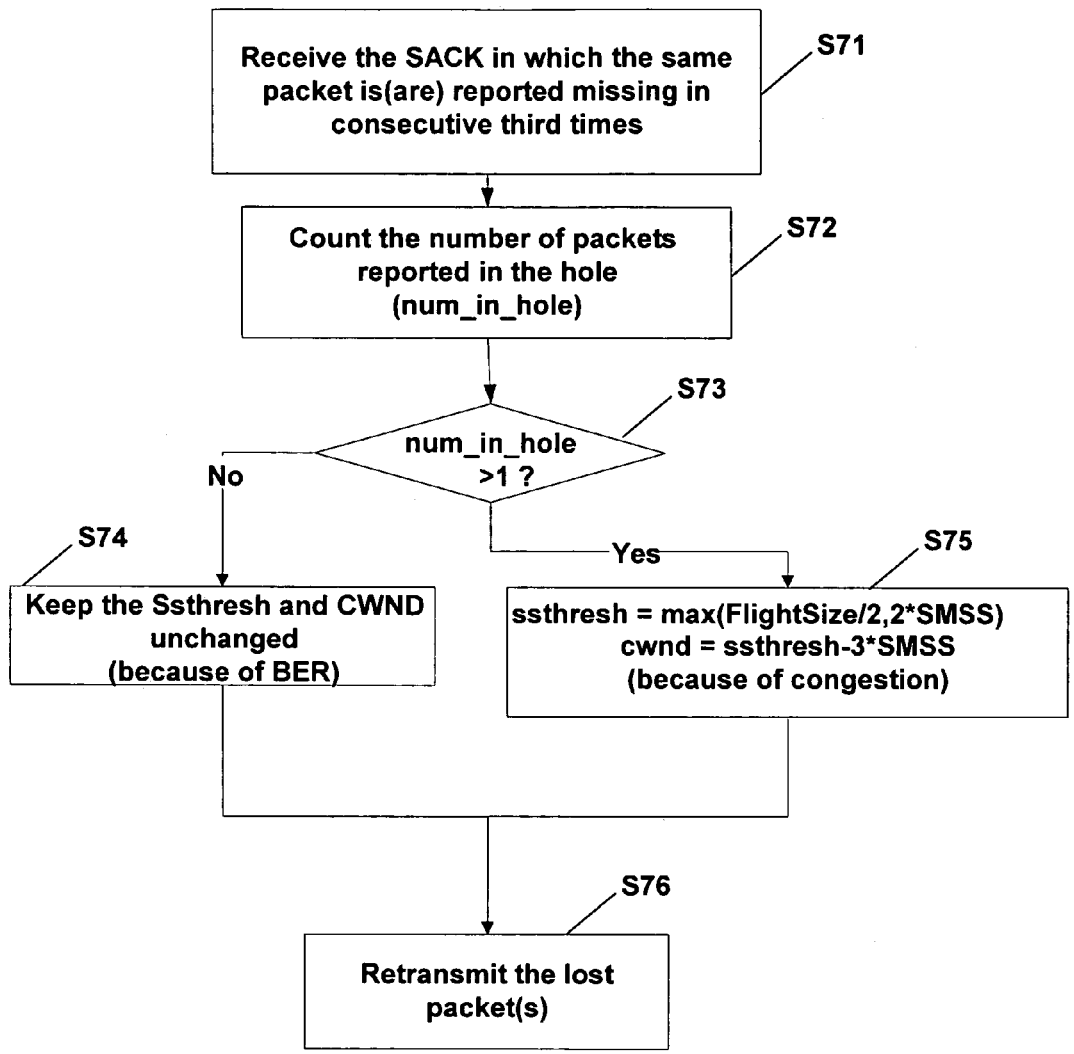
FIG. 7 is a flowchart showing a method for transmitting information according to a further embodiment of the present invention, where TCP with SACK is used as transport protocol for the data transmission between the sender and the receiver.

Since TCP-Sack also provides SACK, the WFRS algorithm is also effective to TCP with sack. An implementation incorporating this algorithm in TCP-Sack is shown in FIG. 7 and described below.

The new end-to-end mechanism (WFRS) reduces the negative effects due to link error over wireless links. As soon as the sender detects the losses, e.g. by using the information of SACK, the sender can distinguish the loss reason. Therefore, there is no delay in deciding on the loss reason, and a reduction of CWND and Ssthresh is avoided when the loss is due to BER. This approach significantly improves the performance of SCTP in a wireless network.

Since SCTP SACK carries the same semantic meaning as the TCP SACK, the present invention (WFRS) can also cooperate with TCP-Sack. Unlike the TCP related solution mentioned above, the present invention (WFRS) does not require substantial modification and processing an intermediate node. This makes it easy for this scheme to inter-operate with the existing infrastructure. Additionally, no support from the receiver or from the network is needed.

Figure 2:
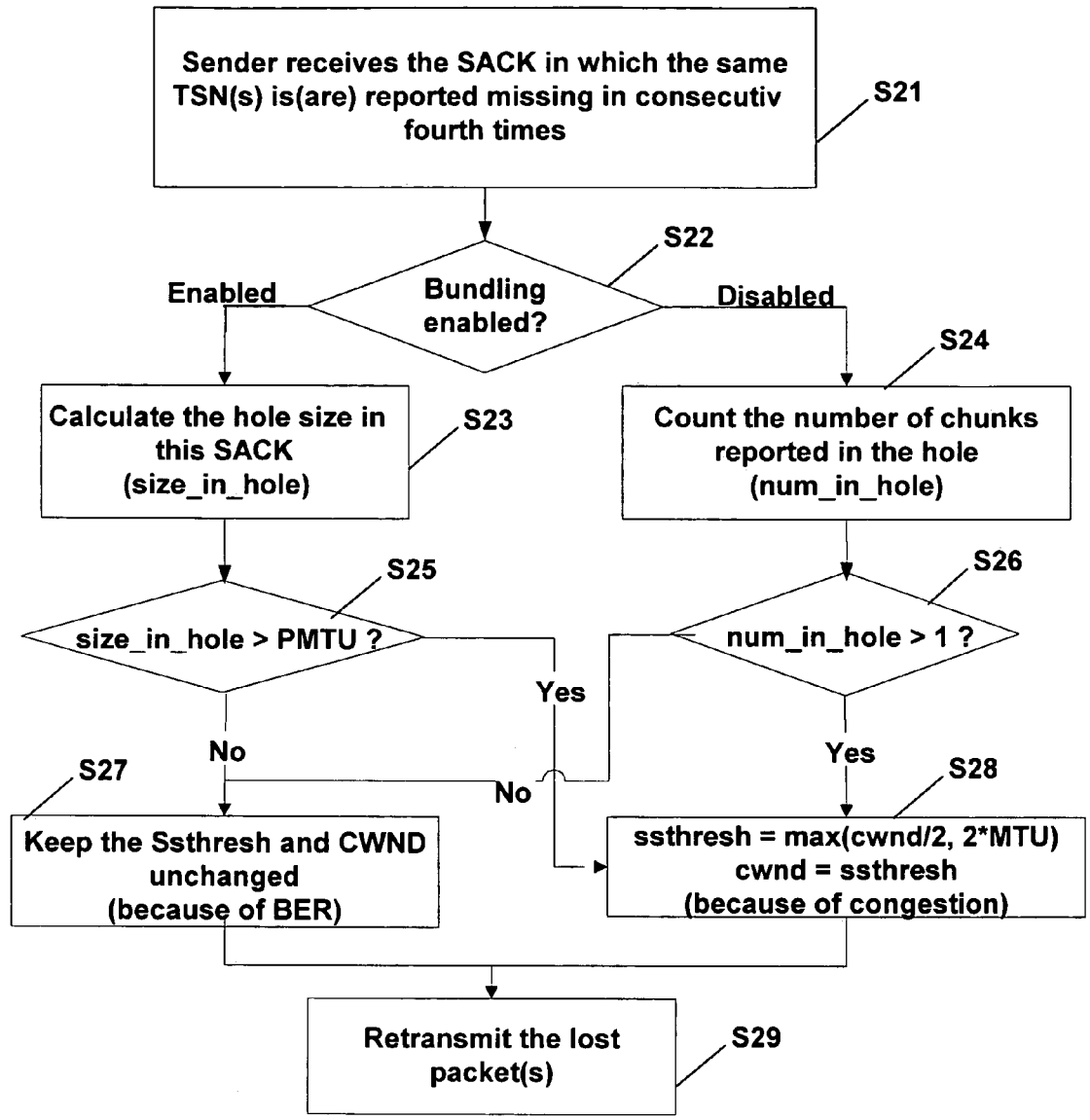
FIG. 2 is a flowchart showing a method for transmitting information according to an embodiment of the present invention, where SCTP is used as transport protocol for the data transmission between the sender and receiver.

FIG. 2 is a flowchart showing an embodiment of a method for transmitting information in accordance with the present invention, where SCTP is used as the transport protocol for the data transmission between the sender and receiver.

The algorithm used in the embodiment of FIG. 2 provides some slight modification to Fast Retransmit algorithm of SCTP, as follows:

When the sender has received the fourth consecutive SACK in which the same TSN(s) are reported missing, the sender detects or calculates the hole (the missing data block) size reported in this SACK. If the bundling is disabled, the sender just records the number of chunks recorded in hole.

The sender compares the detected hole size with the PMTU to judge the reason of packet loss. If the hole size is larger than PMTU, the sender decides that the losses are caused by congestion. Otherwise the losses are decided to be caused by bit error rate.

In case of disabled bundling, if the number of chunks in the hole is greater than one, the sender decides that the losses are an indication of congestion. Otherwise the loss is decided to be caused by bit error rate.

When the determined reason is BER, the SCTP sender just retransmits the lost packet but does not change the value of Ssthresh and CWND to keep the transmission rate. Otherwise, in case the determined reason is congestion, the same action is taken as described in [rfc2960].

In the following, the embodiment of FIG. 2 will be described in more detail. In step S21, the sender receives, for the fourth consecutive times, a SACK message in which the same TSN(s) is(are) reported missing. The sender counts the number of SACKs reporting the same TSNs as missing.

When detecting that this number is four, the process proceeds to step S22. In step S22, the sender checks whether bundling is enabled or not.

If bundling is enabled, the routine proceeds to step S23 where the hole size in this SACK is calculated, and a parameter (size_in_hole) is formed which represents the calculated hole size.

Subsequent to step S23, a step S25 is executed wherein the parameter size_in_hole calculated in step S23 is compared to a threshold value PMTU.

When the parameter size_in_hole is smaller than or equal to the threshold value PMTU (answer in step S25 is No), a step S27 is performed subsequent to step S25. In step S27, a decision is formed to keep the Ssthresh and CWND unchanged since the system and method have decided the detected errors are caused by BER (Bit Error Rate), i.e. link errors occur during the transmission.

Otherwise the parameter size_in_hole is greater than the threshold value PMTU (answer in step S25 is Yes), a step S28 is executed subsequent to step S25. Where the congestion control parameter ssthresh is set to the maximum of the values cwnd/2, and 2*MTU [ssthresh=max(cwnd/2, 2*MTU)], and cwnd is set to ssthresh [cwnd=ssthresh]. This decision is based on the assumption that the detected errors are caused by congestion.

Following step S27 or S28, a step S29 is executed wherein the lost packet(s) is/are retransmitted.

When detecting, in step S22, that bundling is disabled, the program proceeds to step S24 where the number of chunks reported in the hole is counted and a parameter (num_in_hole) is formed which indicates this counted number.

Subsequent to step S24, a step S26 is executed wherein the parameter (num_in_hole) is compared to a defined value, for example, the value 1. When the parameter (num_in_hole) is smaller than or equal to this value (1) (answer in step S26 is No), the routine proceeds to step S27 already described above.

Otherwise, when the parameter (num_in_hole) is greater than this value (1) (answer in step S26 is Yes), the routine proceeds to step S28 already described above.

To further explain the method shown in FIG. 2, the following examples shown in FIGS. 3 to 6 demonstrate sample information in SCTP SACKs received by sender 1 when congestion and link errors occur. In all FIGS. 3 to 6, the left column lists the trigger packets' chunks TSN; the second column is the SACK cumulative-TSN; and the third and fourth columns are the left and right edges of TSNs acknowledged by Gap Ack blocks. In accordance with RFC2960, "left edge" designates the Gap Ack Block Start which indicates the Start offset TSN for this Gap Ack Block. "Right edge" designates the Gap Ack Block End which indicates the End offset TSN for this Gap Ack Block.

In the embodiments shown in FIGS. 3 to 6, it is assumed that the PMTU=1000 bytes; the chunk length=400 bytes; Cumulative TSN=12 The sender sends a burst of 6 packets (TSN13 to 24; FIG. 3). The sender enables bundling and two chunks are bundled in one packet because of the limitation of the PMTU. In. this example, the 1st and 2nd packets are lost due to congestion. So the hole reported in the SACK includes 4 chunks (TSN 13, 14, 15, 16). The hole size=4×400=1600 bytes>PMTU=1000 bytes, so the sender determines the losses are caused by congestion and takes congestion appropriate actions (e.g., S28, S29 in FIG. 2), for instance as described in [RFC 2960].

Referring to FIG. 4, the sender enables bundling and the 1st packet is lost due to BER (Bit Error Rate), that is to say the two chunks of the 1st packets are lost. The hole reported in the SACK includes 2 chunks (TSN 13, 14). The hole size=2× 400=800 bytes<PMTU=1000 bytes. Accordingly, SCTP sender judges the loss reason to be BER and just retransmits (S29) the lost packet but does not change the congestion control parameters (S27), for instance the values of Ssthresh and CWND.

Referring to the example in FIG. 5, the sender has disabled bundling and the 1st and 2nd packets are lost due to congestion. When the sender disables bundling, the embodiment of the present invention shown in FIG. 2 (WFRS) just counts the number of missing chunks reported (S24). Here, there are two chunks (TSN 13 14) in the hole reported by the SACK. This embodiment of the invention (WFRS) treats the loss as congestion because more than one packet is lost. Thus the sender changes Ssthresh and CWND (S28) and retransmits the lost packets (S29).

Referring to the example in FIG. 6, the sender disables bundling and the 1st packet is lost due to BER. There is only one chunk (TSN 13) in the hole reported by the SACK. Accordingly, in this embodiment of the present invention (WFRS), it treats the loss as BER. The sender thus keeps the Ssthresh and CWND unchanged (S27) and retransmits the lost packet (S29).

Therefore, in accordance with one embodiment of the present invention, in case of disabled bundling, a threshold of, e.g., two chunks or packets is set and the system considers a reported loss below or equal to this threshold to be due to BER, and above this threshold to be due to congestion.

In case of enabled bundling, a threshold of, e.g., four chunks is set and the system considers a reported loss above this threshold to be due to BER, and below this threshold to be due to congestion.

Although the above embodiments approach is designed for SCTP, the algorithm can be integrated into TCP-SACK simply. Since SCTP SACK has the same semantic meaning as TCP SACK, the basic idea of the algorithm keeps unchanged.

FIG. 7 is a flowchart showing a method for transmitting information according to a further embodiment of the present invention, where TCP with SACK is used as a transport protocol for the data transmission between the sender and the receiver.

In the process for TCP-SACK shown in FIG. 7, the examples mentioned above with regard to FIGS. 5 to 6 are also applicable. Generally, in this embodiment of FIG. 7, when the TCP sender has received the third consecutive SACK in which the same packet(s) is(are) reported missing, the sender counts how many packets it should retransmit, i.e. how many packets are reported as missing. If the number of packets to be retransmitted is more than one, the sender decides that the losses are caused by congestion.

Otherwise the loss is caused by BER (Bit Error Rate). When the reason is BER, the TCP sender just retransmits the lost packet(s) and keeps the values Cwnd and Ssthresh unchanged. When the reason is congestion, it takes the same actions as described in [rfc2581].

The method shown in FIG. 7 is described below in more detail. In step S71, the sender receives for three consecutive times, a SACK message in which the same packet(s) is(are) reported missing. When detecting this situation of three consecutive SACKs reporting the same packet or packets as missing, the process proceeds to step S72, where the number of packets reported in the hole is counted. This counted number is designated as a parameter, for example, (num_in_hole). In step S73, this parameter num_in_hole is compared to a threshold value, preferably 1, e.g., (num_in_hole>1?)

If the answer in step S73 is No, that is num_in_hole is not larger than the threshold, the process proceeds to step S74, where the present values of Ssthresh and Cwnd are kept unchanged because the detected loss is determined to be due to BER.

If the answer in step S73 is Yes, the method and system determine the detected packet losses to be due to congestion, and the routine goes to step S75, where the values of Ssthresh and Cwnd are changed so as to cope with a congestion situation, for example, as specified in RFC2581. As an example, the value ssthresh is set to the maximum value of the two values FlightSize/2, and 2*SMSS [ssthresh=max(FlightSize/2, 2*SMSS)]. The parameter FlightSize is defined in RFC2581. The value of cwnd is changed to an appropriate value such as ssthresh minus a certain value such as 3*SMSS. [cwnd=ssthresh −3*SMSS].

The routine thereafter proceeds from step S74 or S75 to a step S76, where the lost packet(s) is(are) retransmitted.

For a standard SCTP implementation, only a small modification to the Fast Retransmission is needed to implement the embodiment of the present invention (WFRS) at sender. For TCP, the invention (WFRS) identifies whether the receiver supports a selective acknowledgment option. If the receiver does not support SACK, the embodiment of the present invention may be turned off.

The principles of the present invention can also be used in products for advanced transport protocol, and are compatible with [rfc2960] and [rfc2018].

The invention has been described herein with particular reference to examples. The invention is not limited to such examples, and one skilled in the art will appreciate that the invention is more broadly applicable. The scope of the protection afforded by the invention is defined in the appended claims.

The invention claimed is:

1. A method, comprising:
   transmitting information between a sender and a receiver using packets for information transmission, wherein the receipt of transmitted packets is acknowledged to the sender, and unacknowledged packets are retransmitted from the sender;
   detecting one of an amount of transmitted unacknowledged information and a number of consecutive unacknowledged packets;
   determining a reason for information or packet loss based on the amount of transmitted unacknowledged information or the number of consecutive unacknowledged packets;
   adjusting transmission parameters by the sender, depending on whether the determined reason is a bit error rate or congestion;
   the sender enabling bundling wherein information is bundled in a packet;
   checking whether bundling is enabled; and
   changing a determining parameter to determine the reason for information or packet loss depending on whether or not bundling is enabled.

2. The method according to claim 1, wherein the amount of detected unacknowledged information is compared with a path maximum transmission unit to determine the reason of loss of transmitted unacknowledged information.

3. The method according to claim 1, wherein unacknowledged packets up to a defined number are determined to be a result of bit error rate, and a number of unacknowledged packets larger than the defined number are determined to be an indication of congestion.

4. The method according to claim 1, wherein the sender comprises detecting the amount of unacknowledged information or the number of consecutive unacknowledged packets, and providing congestion control parameters, wherein the congestion control parameters are kept unchanged when the reason for packet loss is determined to be a result of bit error rate, and wherein the congestion control parameters are changed when the reason of packet loss is determined to be a result of congestion.

5. The method according to claim 4, wherein the congestion control parameters comprise congestion window size and slow start threshold.

6. The method according to claim 1, wherein the receiver sends gap acknowledgment blocks to the sender, and the sender decides on the amount of transmitted unacknowledged information or the number of consecutive unacknowledged packets based on received gap acknowledgment blocks.

7. The method according to claim 1, wherein the sender enables bundling of two or more chunks into a packet to be transmitted, each chunk having its individual identification, and received chunks acknowledged to the sender, wherein an amount of information contained in unacknowledged consecutive chunks is compared with a threshold value and the reason for information loss is determined based on the result of comparison.

8. The method according to claim 7, wherein the threshold value is equal to a path maximum transmission unit set for a transmission path via which the packet is to be transmitted.

9. The method according to claim 1, wherein a transmission protocol is used for transmitting the information between the sender and the receiver.

10. The method according to claim 9, wherein the transmission protocol is stream control transmission protocol.

11. The method according to claim 9, wherein the transmission protocol is transmission control protocol.

12. A system, comprising:
    transmitting information between a sender and a receiver using packets for information transmission, wherein receipt of transmitted packets is acknowledged to the sender, and unacknowledged packets are retransmitted from the sender;
    a detecting unit configured to detect one of an amount of transmitted unacknowledged information and a number of consecutive unacknowledged packets;
    a determining unit configured to determine a reason for information or packet loss based on the amount of transmitted unacknowledged information or the number of consecutive unacknowledged packets, wherein the system is configured to change or maintain, depending on whether the determined reason is bit error rate or congestion, parameters acting on the transmission by the sender;
    the sender enabling bundling wherein information is bundled in a packet;
    checking whether bundling is enabled; and
    changing a determining parameter to determine the reason for information or packet loss depending on whether or not bundling is enabled.

13. The system according to claim 12, wherein the determining unit is configured to compare the amount of detected unacknowledged information with a path maximum transmission unit to determine the reason for loss of transmitted unacknowledged information.

14. The system according to claim 12, wherein unacknowledged packets up to a defined number are determined to be a result of bit error rate, and a number of unacknowledged packets larger than the defined number are determined to be an indication of congestion.

15. The system according to claim 12, wherein the sender comprises the detecting unit and a providing unit configured to provide congestion control parameters, wherein the congestion control parameters are kept unchanged when the reason for packet loss is determined to be a result of bit error rate, and wherein the congestion control parameters are changed when the reason of packet loss is determined to be a result of congestion.

16. The system according to claim 15, wherein the congestion control parameters comprise congestion window size and slow start threshold.

17. The system according to claim 12, wherein the receiver sends gap acknowledgment blocks to the sender, and the sender decides on the amount of transmitted unacknowledged information or the number of consecutive unacknowledged packets based on received gap acknowledgment blocks.

18. The system according to claim 12, wherein the sender enables bundling of two or more chunks into a packet to be transmitted, each chunk having its individual identification, wherein received chunks are acknowledged to the sender, and wherein the amount of information contained in unacknowledged consecutive chunks is compared with a threshold value and the reason for information loss is determined based on a result of comparison.

19. The system according to claim 18, wherein the threshold value is equal to a path maximum transmission unit set for a transmission path via which packets are to be transmitted.

20. A sending unit, comprising:
transmitting information to a receiving unit using packets for information transmission, wherein the receipt of transmitted packets is acknowledged to the sending unit and unacknowledged packets are retransmitted from the sending unit;
a detecting unit configured to detect one of an amount of transmitted unacknowledged information and a number of consecutive unacknowledged packets;
a determining unit configured to determine a reason for information or packet loss based on the amount of transmitted unacknowledged information or the number of consecutive unacknowledged packets, wherein the sending unit is configured to change or maintain transmission parameters depending on whether the determined reason is error rate or congestion;
the sender enabling bundling wherein information is bundled in a packet;
checking whether bundling is enabled; and
changing a determining parameter to determine the reason for information or packet loss depending on whether or not bundling is enabled.

21. The sending unit according to claim 20, wherein the amount of detected unacknowledged information is compared with a path maximum transmission unit to determine the reason of loss for transmitted unacknowledged information.

22. The sending unit according to claim 20, further comprising:
a providing unit configured to provide congestion control parameters, wherein the congestion control parameters are kept unchanged when the reason for packet loss is determined to be a result of bit error rate, and wherein the congestion control parameters are changed when the reason for packet loss is determined to be a result of congestion.

23. The sending unit according to claim 20, wherein the sending unit decides on the amount of transmitted unacknowledged information or the number of consecutive unacknowledged packets based on gap acknowledgment blocks received from the receiving unit.

24. The sending unit according to claim 20, which is operative to bundle two or more chunks into a packet to be transmitted, each chunk having its individual identification, and received chunks acknowledged to the sending unit, wherein an amount of information contained in unacknowledged consecutive chunks is compared with a threshold value and the reason for information loss is determined based on a result of the comparison.

25. The system, comprising:
transmitting information between a sender and a receiver using packets for information transmission, wherein receipt of transmitted packets is acknowledged to the sender, and unacknowledged packets are retransmitted from the sender;
detecting means for detecting one of an amount of transmitted unacknowledged information and a number of consecutive unacknowledged packets;
determining means for determining a reason for information or packet loss based on the amount of transmitted unacknowledged information or the number of consecutive unacknowledged packets,
wherein the system is configured to change or maintain, depending on whether the determined reason is bit error rate or congestion, parameters acting on the transmission by the sender;
the sender enabling bundling wherein information is bundled in a packet;
checking whether bundling is enabled; and
changing a determining parameter to determine the reason for information or packet loss depending on whether or not bundling is enabled.

26. A sending unit, comprising:
transmitting information to a receiving unit using packets for information transmission, wherein the receipt of transmitted packets is acknowledged to the sending unit and unacknowledged packets are retransmitted from the sending unit;
detecting means for detecting one of an amount of transmitted unacknowledged information and a number of consecutive unacknowledged packets;
determining means for determining a reason for information or packet loss based on the amount of transmitted unacknowledged information or the number of consecutive unacknowledged packets, wherein
the sending unit is configured to change or maintain transmission parameters depending on whether the determined reason is error rate or congestion;
the sender enabling bundling wherein information is bundled in a packet;
checking whether bundling is enabled; and
changing a determining parameter to determine the reason for information or packet loss depending on whether or not bundling is enabled.

* * * * *